US006353834B1

(12) United States Patent
Wong et al.

(10) Patent No.: US 6,353,834 B1
(45) Date of Patent: Mar. 5, 2002

(54) LOG BASED DATA ARCHITECTURE FOR A TRANSACTIONAL MESSAGE QUEUING SYSTEM

(75) Inventors: David W. H. Wong, Boxborough; Derek L. Schwenke, Marlboro, both of MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 08/963,188

(22) Filed: Nov. 3, 1997

Related U.S. Application Data

(60) Provisional application No. 60/030,905, filed on Nov. 14, 1996.

(51) Int. Cl.[7] .............................................. G06F 12/00
(52) U.S. Cl. ...................... 707/202; 707/100; 707/205; 710/52; 714/15; 714/16
(58) Field of Search ................................. 707/100, 104, 707/202–206; 709/213; 710/52; 711/112; 714/15, 16, 19

(56) References Cited

U.S. PATENT DOCUMENTS

| | | | | |
|---|---|---|---|---|
| 5,222,217 A | * | 6/1993 | Blount et al. ............... | 395/325 |
| 5,452,430 A | * | 9/1995 | Dievendorff et al. .. | 395/183.13 |
| 5,774,715 A | * | 6/1998 | Madany et al. ............. | 707/101 |
| 5,802,344 A | * | 9/1998 | Menon et al. ............... | 711/165 |
| 5,878,056 A | * | 3/1999 | Black et al. .................. | 371/32 |
| 5,892,633 A | * | 4/1999 | Ayres et al. ............. | 360/73.08 |
| 5,907,603 A | * | 5/1999 | Gallagher et al. .......... | 379/133 |
| 6,052,695 A | * | 4/2000 | Abe et al. .................... | 707/202 |

* cited by examiner

Primary Examiner—Matthew Kim
Assistant Examiner—Pierre M. Vital
(74) Attorney, Agent, or Firm—Dirk Brinkman; Andrew J. Curtin

(57) ABSTRACT

A message queuing system is provided that saves and stores messages and their state in an efficient single file on a single disk to enable rapid recovery from server failures. The single disk, single file storage system into which messages and their states are stored eliminates writes to three different disks, the data disk, the index structure disk and the log disk. The single disk, single file storage is made possible by clustering all information together in a contiguous space on the same disk. The result is that all writes are contained in one sweeping motion of the write head in which the write head moves only in one direction and only once to find the area where it needs to start writing messages and their states are stored. In order to keep track of the clustered information, a unique Queue Entry Map Table is used which includes control information, message blocks and log records in conjunction with single file disk storage that allows the write head never to have to back-up to traverse saved data when writing new records. The system also permits locating damaged files without the requirement of scanning entire log files.

9 Claims, 9 Drawing Sheets

| | |
|---|---|
| 122 | NUMBER OF SEGMENTS IN QUEUE FILE |
| 124 | SEGMENT SIZE |
| 126 | QEMT SEQUENCE NUMBER (TIME STAMP) |
| 128 | SEQUENCE NUMBER OF LAST LOG RECORD IN PREVIOUS SEGMENT |
| 130 | CURRENT SEGMENT NUMBER |
| 132 | QUEUE HEAD POINTER |
| 134 | QUEUE TAIL POINTER |
| 136 | NEXT AVAILABLE BLOCK IN CURRENT SEGMENT |
| 138 | LIST OF QEM ENTRIES |
| 140 | RESERVATION TABLE OF DISK BLOCKS |
| 142 | PENDING TRANSACTION LIST ACTING AS COORDINATOR |
| 144 | PENDING TRANSACTION LIST ACTING AS PARTICIPANT |

Fig. 7

138 {
- SEQUENCE NUMBER, 146
- MESSAGE ID, 148
- MESSAGE OPERATIONAL MODE (EITHER QPUT OR QGET), 150
- MESSAGE RECIPIENT'S NODE NAME, 152
- MESSAGE RECIPIENT'S SERVICE NAME, 154
- TRANSACTION STATE (ACTIVE|PENDING|ABORT|COMMIT), 156
- PARTICIPANT 2PC VOTE, 158
- SET OF ADDITIONAL FLAGS, 160
- POINTER TO ON-DISK LOCATION OF MESSAGE, 162

Fig. 8

LOG BASED DATA ARCHITECTURE FOR A TRANSACTIONAL MESSAGE QUEUING SYSTEM

CROSS-REFERENCE TO RELATED APPLICATIONS

A claim of priority is made to U.S. Provisional Patent Application Serial No. 60/030,905, filed Nov. 14, 1996, entitled LOG BASED DATA ARCHITECTURE FOR A TRANSACTIONAL MESSAGE QUEUING SYSTEM.

FIELD OF INVENTION

This invention relates to message queuing, and more particularly to a fast, reliable message queuing system for both client-server and mobile agent applications.

BACKGROUND OF THE INVENTION

Message queuing is the most fundamental paradigm for communication between applications on different computer systems due to its inherent flexibility in allowing both synchronous and asynchronous processing. The message queuing middleware infrastructure is a very flexible framework for a number of application domains in both general client-server as well as mobile agent computing arenas, to wit work flow computing, object messaging, transactional messaging and data replication services.

It will be appreciated that in many transactional messaging scenarios data is oftentimes lost during the transmission. This is no more catastrophic than in the banking industry in which banking records transmitted from one location to another can be lost due to server failures, transmission line failures or other artifacts. It is incumbent upon the system managers to be able to quickly locate the fact that an error has occurred and to be able to reconstruct the data from a known point where the data was valid.

Establishing that point at which an error has occurred has in the past been accomplished by systems which scan an entire so-called log file to reconstruct the up-to-date state of the system before the crash. Log files are routinely utilized with their associated time stamps to identify messages and the data they contain. However, the scanning of entire log files to ascertain the up-to-date state can require scanning as many as 1,000 log records.

Not only is the scanning of the overall log record an inefficient way to ascertain where an error occurred and to be able to reconstruct files from that point, systems in the past have required two disk files, one serving as a data file, and the other serving as a log file.

Moreover, the correlation between the log entries and the data files or sectors is complicated by the fact that in the past, sectors were stored in some indiscriminant order, leaving the mapping between the log file and the sectors a somewhat time consuming process.

By way of further background, it will be appreciated that message queuing is used in general to be able to provide a fail-safe storage for data records which are transmitted from one point to another. If, for instance, an error occurs and data is lost at one location, it can be reconstructed at a second location due to the storage inherent in message queuing.

As an example, it is desirable, especially in stock market trades, that any interruption in trading to be minimized to minutes as opposed to hours. On occasion, however, when system servers go down, recovery can take from two to eight hours depending on the number of trades in the system at that time. There is thus a need to minimize down time and expense of locating and reconstructing damaged files.

Note that as used herein, the term queue file refers to the physical storage of messages that are in transmission. Queue files may also be viewed as holding cells for uncompleted operations. Basically, what this means is that if the receiver is not there to receive a given message, the message is held in the queue file and is deliverable at a later time. As a result, the queue files offer reliability in the retention of information that is transmitted.

Moreover, in traditional systems, the recovery data is not provided by the queue file itself. Thus, queue files have not been utilized to identify the state of the file when an error or lost data has occurred, and have thus not been used to reconstruct the data file from data which is previously uncorrupted. In a traditional system, the recovery data is not provided by the queue file itself.

Another example of how message queuing is applied to a real-world application involves how a message queuing infrastructure may support real-time on-line transaction processing using mobile agents. In this example, the customer, for instance, is a bank with geographically dispersed branches. Customer accounts are created and kept at the local branches where the account was opened. For illustrative purposes, this is called the home branch of the account. A copy of each account is also kept at the main office. A read operation on an account can be made from either the local branch or the main office. An update to an account, however, will require that both the home branch copy and the main office copy be updated in a coordinated fashion.

If the update request occurred at the home branch, the local copy must then be updated. This update can trigger an agent which then automatically submits an enqueue request to the queue manager or queue server. This queue manager in turn dequeues the request across a wide area network to another queue manager, which in turn, dequeues the update request to the database server for the mirror office accounts.

A message queue in this example provides asynchronous and reliable processing. Asynchronous processing begins with the agent that is triggered by the database update at one location. The agent submits the update request to the message queue manager in an asynchronous manner, and need not wait around for a response. The message queue manager serves as holding cell for the request so that the requester can continue processing without the need to wait for a response. The message queue manager also provides reliability in this example in that it maintains a copy of the update request in its queue until the recipient of this update request has acknowledged its receipt via a well-known handshaking protocol called the Two Phase Commit protocol, known in the industry as transactional message queuing.

While these types of message queuing systems have operated reliably in the past, they have relied on a data architecture that uses separate queue data and log record files to store the messages that are appended to a message queue. This architecture prevents rapid repair at the time of a serve crash and requires two storage disks, one for data and one for the log records. Moreover, traditional message queuing architectures are generally not optimized for write operations without requiring extra hardware to work efficiently, and are not appropriate for high throughput systems with low message residence times. The separate queue data and log files mentioned above also introduce an extra level of unreliability since there exists two points of potential file corruption and media failure. Additionally, there is usually no means for the message queuing systems administrator to predefine the amount of work needed to do recovery a priori.

Note, the above systems are commercially available as Digital Equipment Corporation's DECmessageQ, IBM's MQ Series, and Transarc's Encina RQS.

SUMMARY OF INVENTION

In order to solve the above noted problems with traditional message queuing, a message queuing system is provided that saves and stores messages and their state in an efficient single file on a single disk to enable rapid recovery from server failures. The single disk, single file storage system into which messages and their states are stored eliminates writes to three different disks, the data disk, the index structure disk and the log disk. The single disk, single file storage is made possible by clustering all information together in a contiguous space on the same disk. The result is that all writes are contained in one sweeping motion of the write head in which the write head moves only in one direction and only once to find the area where it needs to start writing messages and their states are stored. In order to keep track of the clustered information, a unique Queue Entry Map Table is used which includes control information, message blocks and log records in conjunction with single file disk storage that allows the write head never to have to back-up to traverse saved data when writing new records. The system also permits locating damaged files without the requirement of scanning entire log files.

In order to find the most recent valid data, a control check point interval system is utilized to find the most recent uncorrupted data. Scanning to find the most recent check point interval permits rapid identification of the last queue. Subsequent scanning of log records after the checkpoint establishes the most up-to-date state of all messages. The above system permits data recovery in an order of magnitude less time than previous systems, while at the same time establishing an efficient forward writing mechanism to prevent the need for searching through unordered sectors.

In one embodiment, a circular wrap around buffering system is used in which a modification of a previous sector is made by appending a new record at the last sector to indicate that the state of a file has changed, thus to reuse previous blocks that have been freed and no longer hold valid messages and/or log records.

The present invention thus provides a log-based data architecture for transactional message queuing systems which utilizes a combined on-disk file structure for the message queue data and log records. It is the combined queue data/log record file, in one embodiment, on a single disk, which improves write operation performance and reliability, while at the same time reducing the number of disks used.

As mentioned above, system crash recovery is accelerated through the use of a Queue Entry Map Table which does not require searching though all of the log records to ascertain where the error occurred. The use of the Queue Entry Map Table also permits a priori assigning the number of requirements on a queue data file that results in extensibility and flexibility to system administrators.

Also as mentioned above, the subject system utilizes a circular queue that implies that there is potential wrap around of the queue data file for storage reuse. This requires that a reservation table or free space heap be maintained to ensure that when the queue wraps around, subsequent write operations do not overwrite queue data and/or log records that might still be valid.

In one embodiment, the queue data storage architecture consists of a single flat file that is created when a queue manager is first initialized based on a fixed size for the queue. The initial queue creation is based on the system administrator's feel for the peak load on the message queuing system, e.g., the maximum number of expected entries in message queue at any given point in time. Each message in the queue data file contains a Message Header and a Message Body. The Message Body, which contains the message content, is stored on disk in subsequent contiguous blocks that follow the message header.

In the above embodiment, the queue data file is partitioned into a predefined number of logical segments or sectors which can be extended at run time. Each segment contains a copy of the Queue Entry Map Table or QEMT for short, which is stored at the beginning of each segment. The QEMT contains control information for the queue entries and log record information stored in the entire queue file. Message headers, message bodies, and log records are stored after the QEMT with potential mixing of message data and log record blocks.

As will be appreciated, the QEMT size depends on some expected maximum number of queue entries defined by the user at queue creation time. Since the log record takes up some deterministic number of bytes, the queue data file will consist of mixed data types of log records, message headers, message bodies, and QEMTs.

When a new segment is reached in the queue data file, a new QEM Table is written to disk at the beginning of the new segment, with the message and log records following the QEM Table. Since the smallest on-disk data type is the log record, a segment in the queue data file is defined to consist of blocks, where one block is the size of the log record. This implementation enhancement simplifies development of search algorithms.

The state of a transactional message queuing system is captured by the control information contained in a QEMT. The QEMT is defined as a static data structure that multiple threads can operate on, rather than each thread maintaining its own copy.

As a result of the log-based data architecture, the subject invention provides a number of improvements over existing transactional message queuing data architectures. It improves on the performance of the write operation over existing message queuing architectures, which makes message queuing systems based on this invention highly appropriate for high throughput systems with low message residence times such as high speed banking applications. The subject system is also applicable to the underlying reliable messaging infrastructure for the transport of agents over unreliable networks and/or networks with different bandwidths.

Moreover, message data and log record write operations always proceed in the forward direction and both can be stored on the same disk file.

This system also improves the reliability of transactional message queuing systems. In this log-based data architecture, there exists a single place where file corruption can occur versus two potential file corruption scenarios with separate queue data and log record files. Reliability is also improved since fewer disk files are used. A combined queue data/log record file adheres to the Atomicity, Consistency, and Isolation properties of the well-known ACID properties. Also, as will be seen, one can utilize existing RAID technology to do transparent duplicate writes.

The subject system allows the resulting message queuing system to support any method of message data access including First In First Out, Last In First Out or priority-based message data access, while at the same time reducing the amount of time needed for recovery from system crashes. Instead of scanning all data in an entire file for log records in traditional approaches, the subject system only requires that one test a few Queue Entry Map Tables first to determine the most recent checkpoint, and then proceed to scan the log records within that segment.

Moreover, the subject system provides extensibility and flexibility to message queuing systems administration since the invention allows the administrator to control how much work they want to do on system recovery by a priori predefining the number of segments on a queue data file, and subsequently the number of checkpoint intervals, again determined a priori. System administrators can thus pay the overhead cost of writing the checkpoints up front to avoid paying the heavier cost of doing extensive log record scans upon recovery. This tradeoff can be adjusted and fine-tuned to suit the application requirements and domains.

The above advantages flow from the use of a pre-allocated on-disk queue buffer containing queue control information, message data, and transactional log records of message operations. The on-disk queue buffer consists of a number of segments or sectors. Each segment consists of the same predefined number of blocks. At the beginning of each segment is the aforementioned Queue Entry Map Table, which contains control information data regarding the state of the individual queue entries, and pointer offsets to where on disk the messages are physically stored. The Queue Entry Map Table serves as a fixed checkpoint interval for the entire message queuing system. Messages and transactional log records of message operations are stored on the blocks in the segment such that message blocks and log record blocks can be intertwined. Moreover, there is no requirement that the log record for a particular message be stored contiguously to the message.

As a feature of the subject invention, a message data write operation always proceeds in a forward manner for the disk head. Additionally, a message is stored contiguously on disk with no need for pointer traversal. Further, a log record write operation always proceeds in a forward manner for the disk head. Log records are written for change of state in a message operation that follows the Two Phase Commit protocol. Therefore, log records can be written for Prepare, Prepared, Commit, Abort, Acknowledge messages from a remote queue manager.

As an another unique feature, the entire queue can be scanned in a single pass. Moreover, on-disk garbage collection is always a linear process. Additionally, there exists a number of Queue Entry Map Tables on the same file, with the unique sequence number of the most recent table being stored on disk on a graceful shutdown of the queue manager.

Importantly, the read operation can follow the First In First Out, Last In First Out, or Priority-based policy such that no special provision is needed to implement any of the three policies.

Moreover, the recovery procedure is accelerated by searching only the Queue Entry Map Tables timestamp. This is because, the most recent Queue Entry Map Table serves as the starting state for the recovery process. Log records following this table are then read sequentially and changes are then made to the in-memory copy of this most recent Queue Entry Map Table to reflect changes made after the last known checkpoint.

BRIEF DESCRIPTION OF THE DRAWINGS

These and other features of the Subject Invention will be better understood with reference to the Detailed Description taken in conjunction with the Drawings, of which:

FIG. 7 is a table illustrating the QEMT structure, including the QEMT sequence number which serves as a time stamp and which contains the incremental check point information required to restore the system;

FIG. 8 is a table providing information to permit the restoration of individual message states;

DETAILED DESCRIPTION

Figure 1:
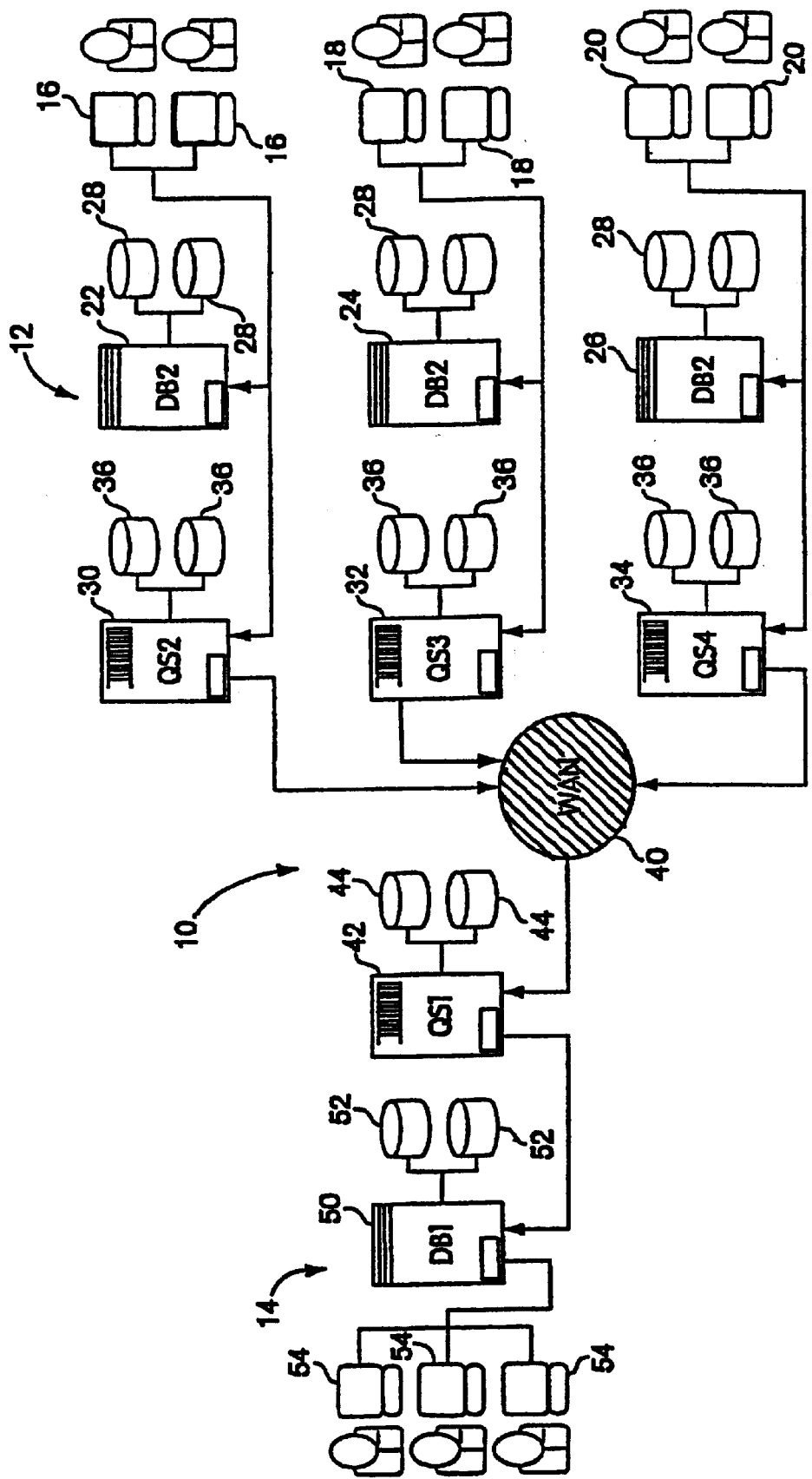
FIG. 1 is a block diagram of a typical banking application utilizing the subject system in which messages flow from the main office to subsidiary branches.

Referring now to FIG. 1, a message queuing system 10 is provided between branch offices of banks 12 and a main office 14 for the purpose of transmitting updated account information from the branches to the main office. In order to accomplish this, data is entered at terminals 16, 18 and 20 respectively at different branch offices of the bank. This data is stored in local database servers 22, 24 and 26 of the respective branches, with each database server having its own local storage, here designated by reference character 28.

The output the database server is coupled to a series of message queuing servers 30, 32 and 34 respectively, each having their own storage units, here labeled by reference character 36.

The outputs of the message queuing servers are applied to a wide area network 40 which couples the outputs to a message queuing server 42 at the main office, with this server having associated respective storage units 44 as illustrated. The message queuing server 42, communicates with a database server 50 having its associated units 52 as illustrated. The output of the message queuing server 42 is coupled to a database server 50 having its associated units 52 as illustrated. The information in this database is viewable at terminals 54 at the main office.

It is the purpose of the message queuing system to be able to reliably transmit updated account information from the branches so that it will reside at the main office. It is also important that the transaction at the branches can proceed without regard to direct connection to the central office.

Figure 2:
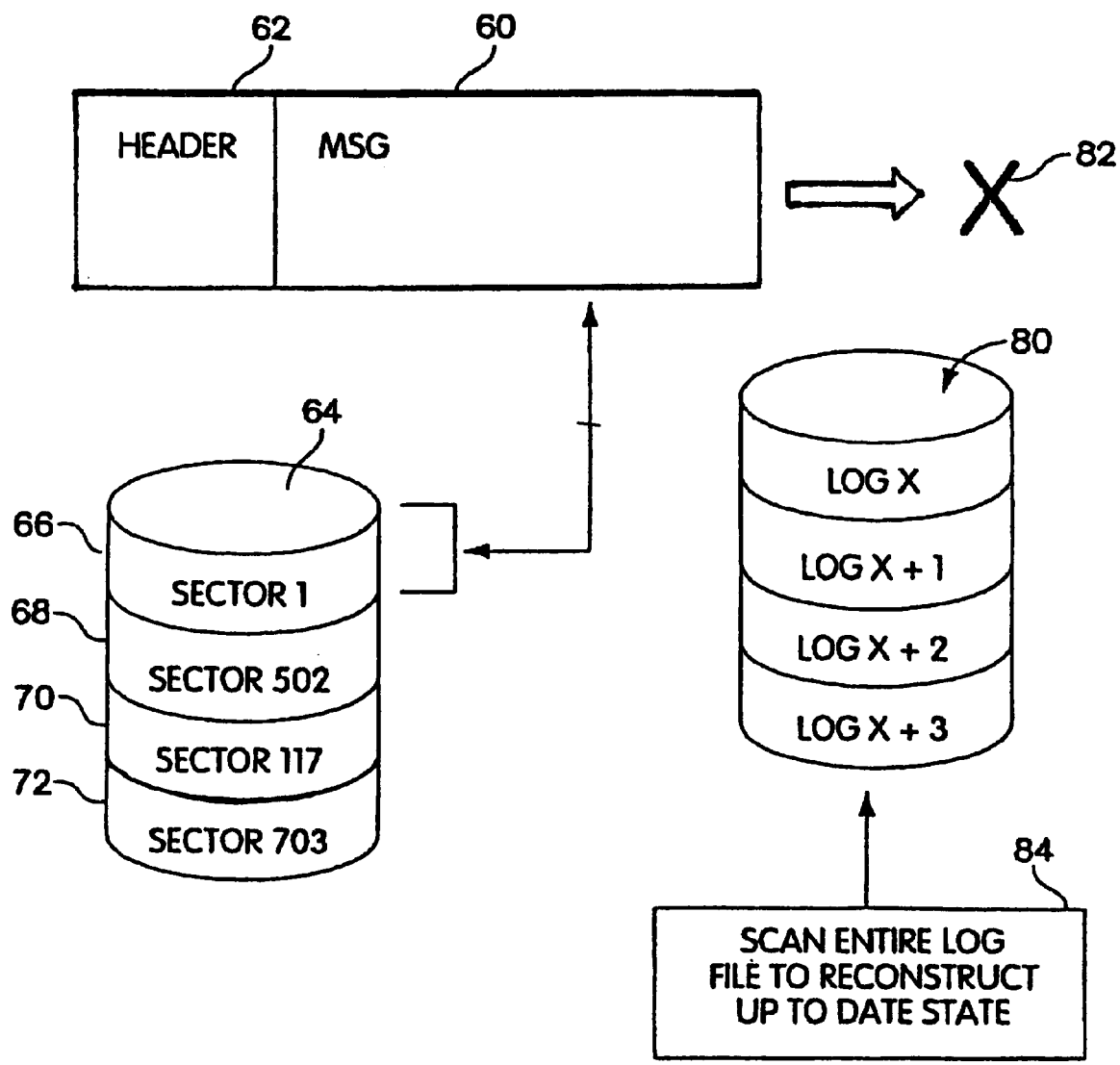
FIG. 2 is a diagrammatic representation of a two file system in which data is recorded at one file, whereas logs are recorded on a separate file, with the data stored at non-consecutive sectors and with the requirement that the entire log file be scanned in order to reconstruct an up-to-date state, the recovery process involving both the data file and log file to obtain the complete state of all messages in the system.

Referring now to FIG. 2, in the past messages and headers such as illustrated at 60 and 62 were stored on data disks 64 in sectors 66, 68, 70 and 72, with the message and accompanying header being randomly placed within the sectors.

At the same time, message state information was stored on a log disk 80 which included records about each message stored in the data disk, including the order of arrival and its location on the data disk. Moreover, the state of the transaction was logged into log disk 80 for each of the messages and corresponding headers.

In the case of an interrupted transmission as indicated by "X" 82, in the past was a requirement that the entire log file, here illustrated at 84, be scanned to be able to reconstruct the up-to-date state of the data disk file just prior to the interruption of the transmission. As mentioned hereinbefore, this is a time-consuming process in which the entire log file must be scanned in order to be able to reconstruct the state of the system just prior to the crash. The situation is made even more complicated due to the storage of the message and header information at nonsequential sectors on the data disk, requiring the interaction of the log file and the data file in order to locate those messages which are uncorrupted at the time of the interruption of the transmission.

Figure 3:
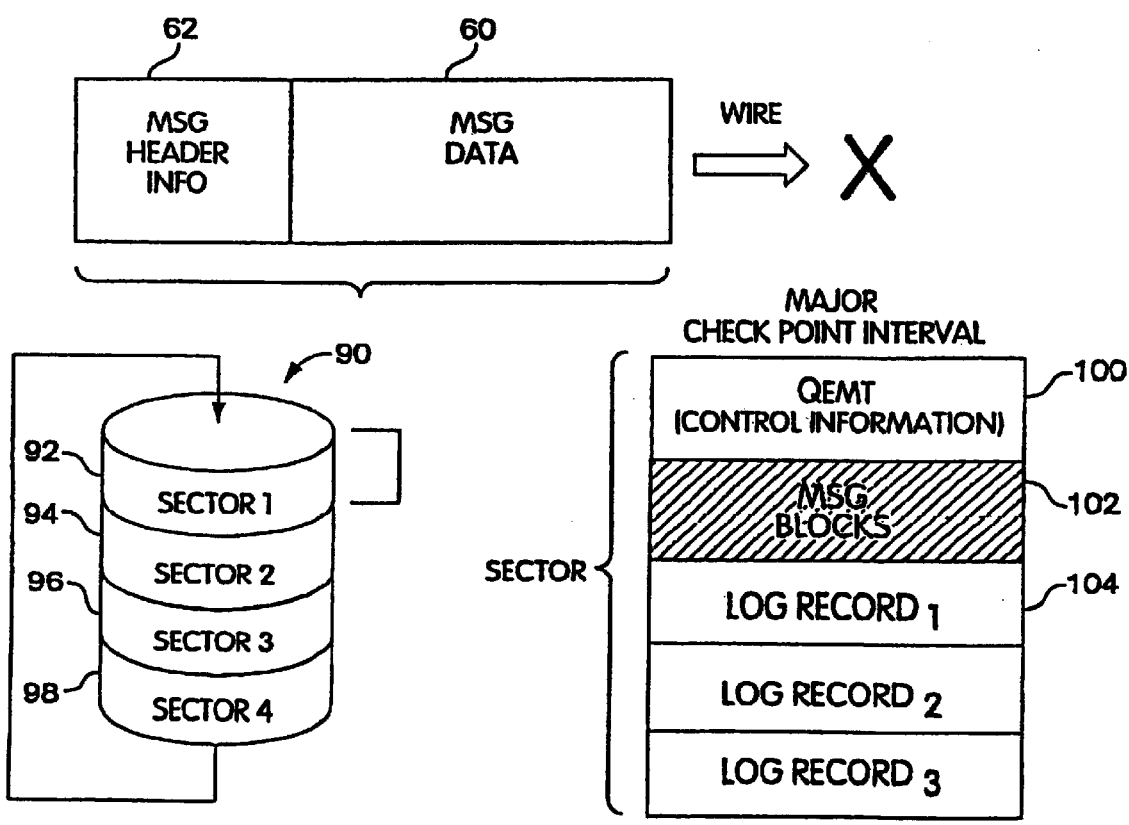
FIG. 3 is a diagrammatic representation of the subject system in which a single file is utilized to store the data and QEMT mapping table to permit rapid recovery of lost data with a minimum amount of hardware and with reduced scanning time required for data recovery.

Referring now to FIG. 3, in the subject system message data 60 and message header information 62 are stored on a single disk storage 90 in sequential sectors, here illustrated at 92, 94, 96 and 98. It is a feature of the subject invention that the message and header information is stored in an order which is accessible through the utilization of a queue entry management table, which locates message data through a checkpoint system to be described.

It will be appreciated that the message data is not stored across all of the sectors, but rather is stored in the above-mentioned sequential manner.

In order to be able to access the data stored in file 90, the queue entry management table, or QEMT, contains sector information which includes entries for control information 100, message blocks 102 and log records 104 all of which are designed to uniquely specify the sector in which relevant data and headers can be found. The QEMT therefore specifies the state of the system in so doing.

Figure 4:
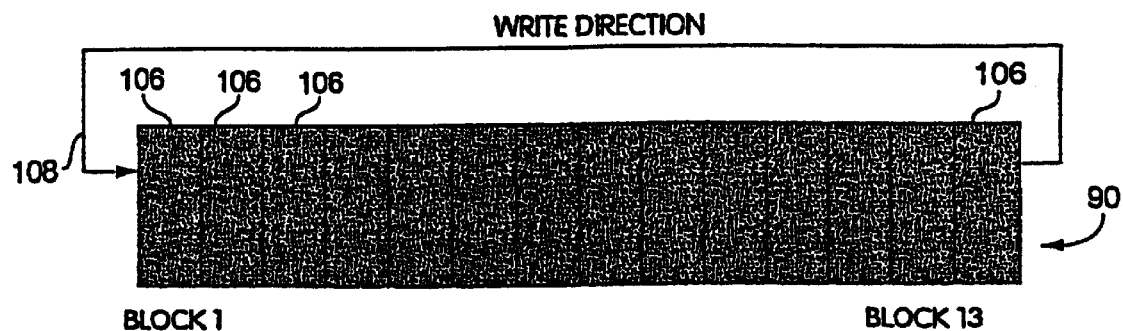
FIG. 4 is a diagrammatic illustration of the storage of blocks of data within the file of FIG. 3, indicating a circular file with a single write direction.
Figure 5:
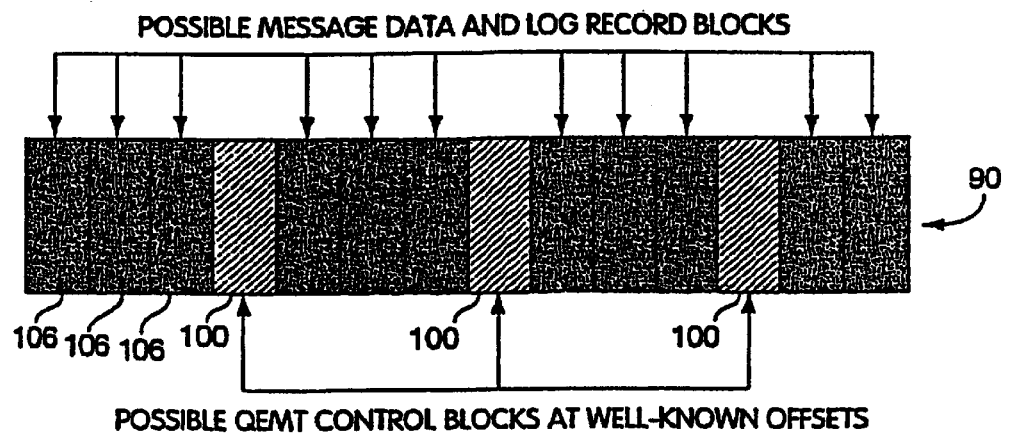
FIG. 5 is a diagrammatic illustration of the possible QEMT control blocks at various well known positions or offsets within the file indicating that through the utilization of these QEMT control blocks, the position and/or location of valid data can be easily ascertained.
Figure 6:
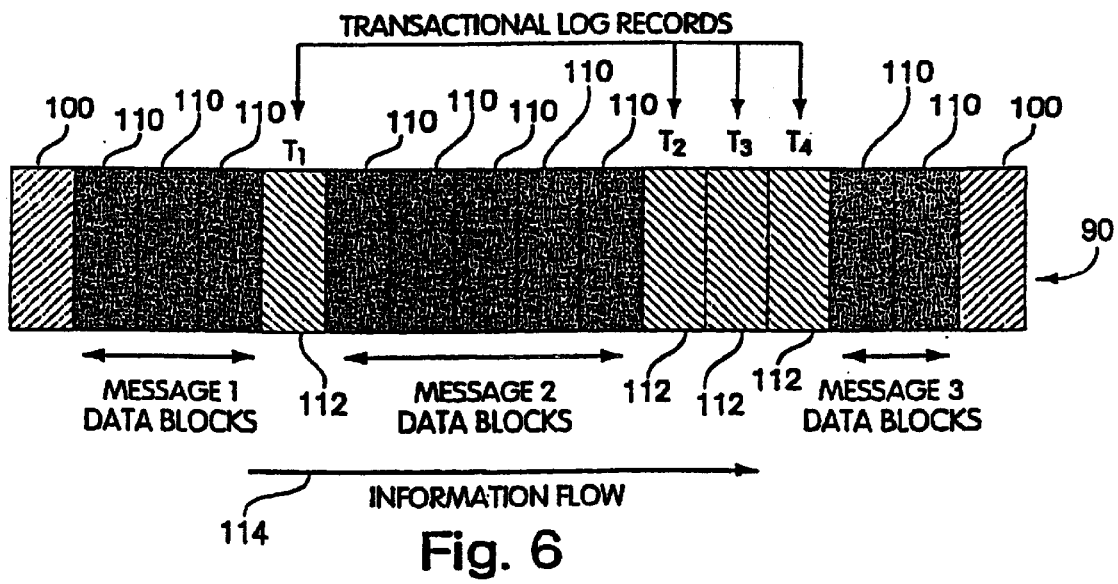
FIG. 6 is a diagrammatic illustration showing the interdispersion of state change log records with the message data blocks to enable the forward writing of the file.

As will be seen in connection with FIGS. 4, 5 and 6 the Queue Entry Management Table is stored in file 90 interspersed between message data and header information.

Referring now to FIG. 4, in one embodiment, file 90 is arranged such that contiguous sectors have blocks of information, here illustrated at 106, with the blocks of information entering from the left as illustrated by arrow 108 and traversing the file from left to right as illustrated by block number 1 entering from the left and block number 13 exiting from the right. It will be understood that the contiguous of blocks and the flow through the file creates a so-called write direction which does not change.

Referring now to FIG. 5, it will be seen that the aforementioned QEMT control blocks 100 can be interspersed between other contiguous blocks 106 so that the position of the QEMT control information blocks 100 specify check points at well-known offsets throughout file 90.

The purpose of interspersing the QEMT control blocks at regular intervals is to be able to quickly locate a complete system state containing specific message data and header information by merely specifying the checkpoint number or checkpoint interval, as the case may be. The result is that it is possible to have message data and log record blocks to either side of a control QEMT control block, such that upon identification of a check point interval as being the last to have valid information, the contiguous blocks written after the QEMT block specifies where valid data may be found as well as its identity and location.

As an alternative explanation, the QEMT control blocks provide the recovery process with well-known locations to examine the state of the system.

Referring now to FIG. 6, it will be seen that blocks 106 can be utilized as message data blocks as illustrated at 110 or incremental log blocks as illustrated at 112, with blocks 112 corresponding to log record 104 of FIG. 3. These log records record state changes to messages in contiguous downstream blocks. Note, the control block provides only some known point for the beginning of the examination of the file, whereas the log records provide information concerning individual messages in the file.

Referring back to FIG. 3, it will be appreciated that log record 104 is but one of a number of sequential log records relating to the data having its start point indicated by the QEMT control block. These log records record changes to information in the preceding message block so that a complete history of changes to that particular message block are annotated.

Referring back to FIG. 6, it is noted that a given number of message blocks are bounded by QEMT control blocks which specify additional message data blocks that have occurred after the check point. Within this sector are transactional log records 112. It will be seen that log record $T_1$ can describe a change in any one of the message blocks. As can be seen from arrow 114, the information flow is from left to right. This being the case, transactional log record $T_1$ can describe the state change for any message in the system, which could be an acknowledgment that the message has been received and is no longer needed to be kept, or that a message has been sent and has not been received or acknowledged, the above reflecting the two pass handshaking technique for the transmission of the secure messages in this type of system.

For instance, transactional log record $T_1$ could indicate that a new message has been added to the file at that particular point. It will be appreciated that the position of the log record is determined by the write head when the log record is created. Thus, when the log record is created at a time $T_1$ the write head is at a particular point in the file. However, the log record can refer to transactions and messages anywhere within the whole file structure.

Likewise, transactional log records $T_2$, $T_3$ and $T_4$ reflect that these messages have changed state, with these log records being posted sequentially in time.

It will be appreciated that since the QEMT blocks and the log record blocks are insertable into the single file structure and since the single file structure in one embodiment has a information flow in one direction, it is possible to completely eliminate the two-file structure of the prior art.

Moreover, the utilization of the QEMT blocks and the transactional log record blocks permits rapid diagnose of the effect of information interruption, with a way of specifying uniquely those messages which are uncorrupted, while thereafter permitting rapid recovery of the state of the system after failure.

Referring now to FIG. 7, the organization of the Queue Entry Management Table header is illustrated at 120. As can be seen, in one embodiment, the header includes the number of segments in a queue file 122, the segment size 124, the QEMT sequence number or timestamp 126, the sequence number of the last log record in the previous segment 128, the current segment number 130, the queue head pointer 132, the queue tail pointer 134, the next available block in the current segment 136, the list of QEMT entries 138, the reservation table of disk blocks 140, the pending transaction list acting as coordinator 142 and the pending transaction list acting as participant 144.

It will be appreciated that the information contained in the header is supporting information for the recovery process.

Referring now to FIG. 8, each QEMT entry 138 includes a sequence number 146, a message ID 148, a message operational mode 150, which is either $Q_{put}$ or $Q_{get}$, the message recipient's node name 152, the message recipient's server name 154, the transaction state 156, which is either "active", "pending", "abort" or "commit", the participant 2 PC vote 158 which is the last known response that was received by the receiver, a set of additional flags 160 and a pointer on-disk location of message 162.

Thus the Queue Entry Management Table provides exact information as to the state of the file and more particularly any queue entry.

Figure 9:
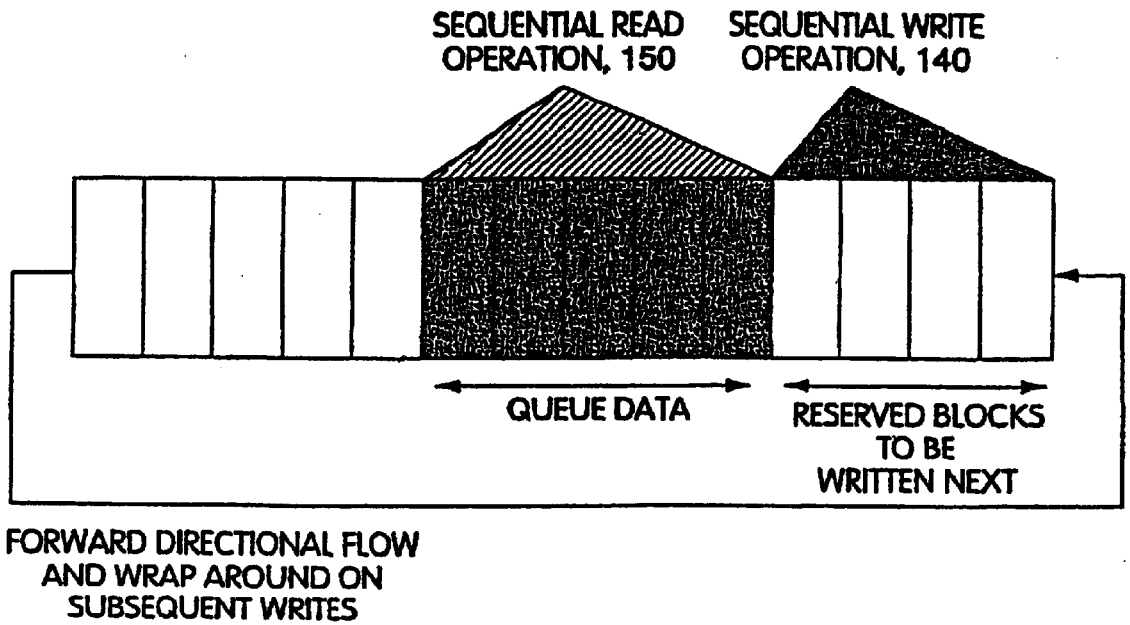
FIG. 9 is a diagrammatic illustration of the forward directional flow of data in a wrap around system in which a circular queue is implemented.

Referring now to FIG. 9, what will be appreciated is that since a single message is stored in contiguous blocks, the reprocess involves reading contiguous blocks back. As a result, this cuts down on the head movement during a read operation.

In summary, in the prior art doing a read might require the read head to traverse noncontiguous blocks, and therefore take a considerable amount of time. In the subject system since the message are stored in contiguous blocks, only traversing these contiguous blocks is necessary in the read operation 150. Likewise, for a sequential write operation 140, the head traverses only a limited amount of the file.

In short, because there is a forward directional flow and wrap around on subsequent writes, the data is arranged in contiguous blocks and the above advantages flow therefrom.

Figure 10:
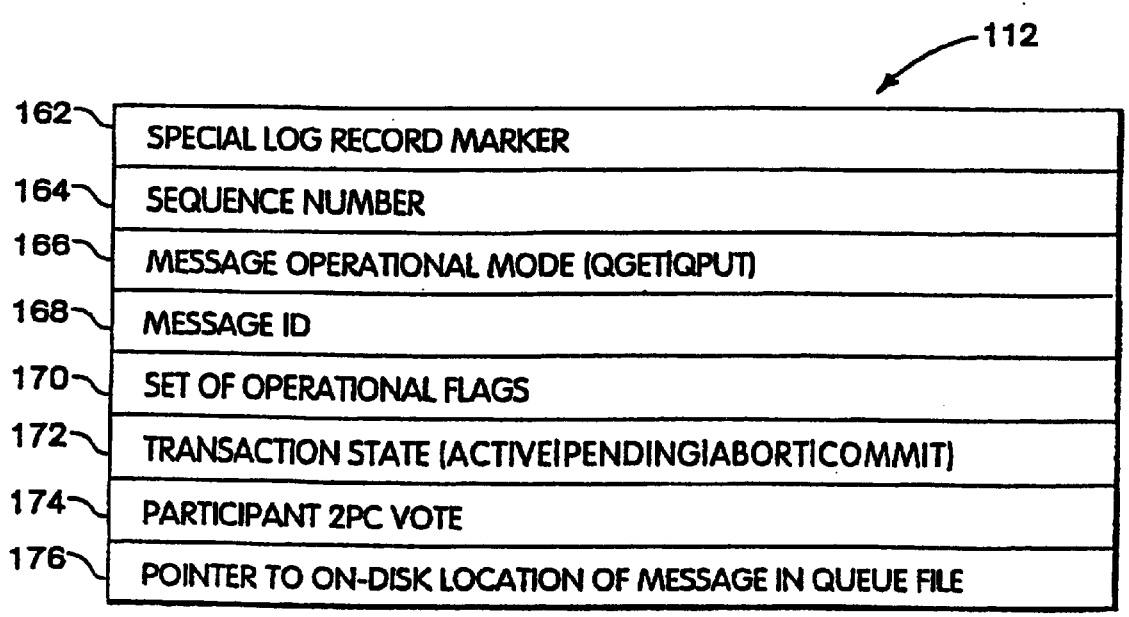
FIG. 10 is a table illustrating the information stored in the incremental log record with the log entries of FIG. 6.

Referring now to FIG. 10, the transactional log record 112 of FIG. 6 includes a special log record marker 162 in one embodiment. In this embodiment, a sequence number 164 is provided along with a message operational mode 166 which refers to either a $Q_{get}$ or $Q_{put}$ operation. Also included is a message ID 168, a set of operational flags 170, the transactional state 172 which includes "active", "pending", "abort" or "commit" states, the participant 2 PC vote 174 mentioned above and a pointer 176 to on-disk location of message in queue file.

Figure 11:
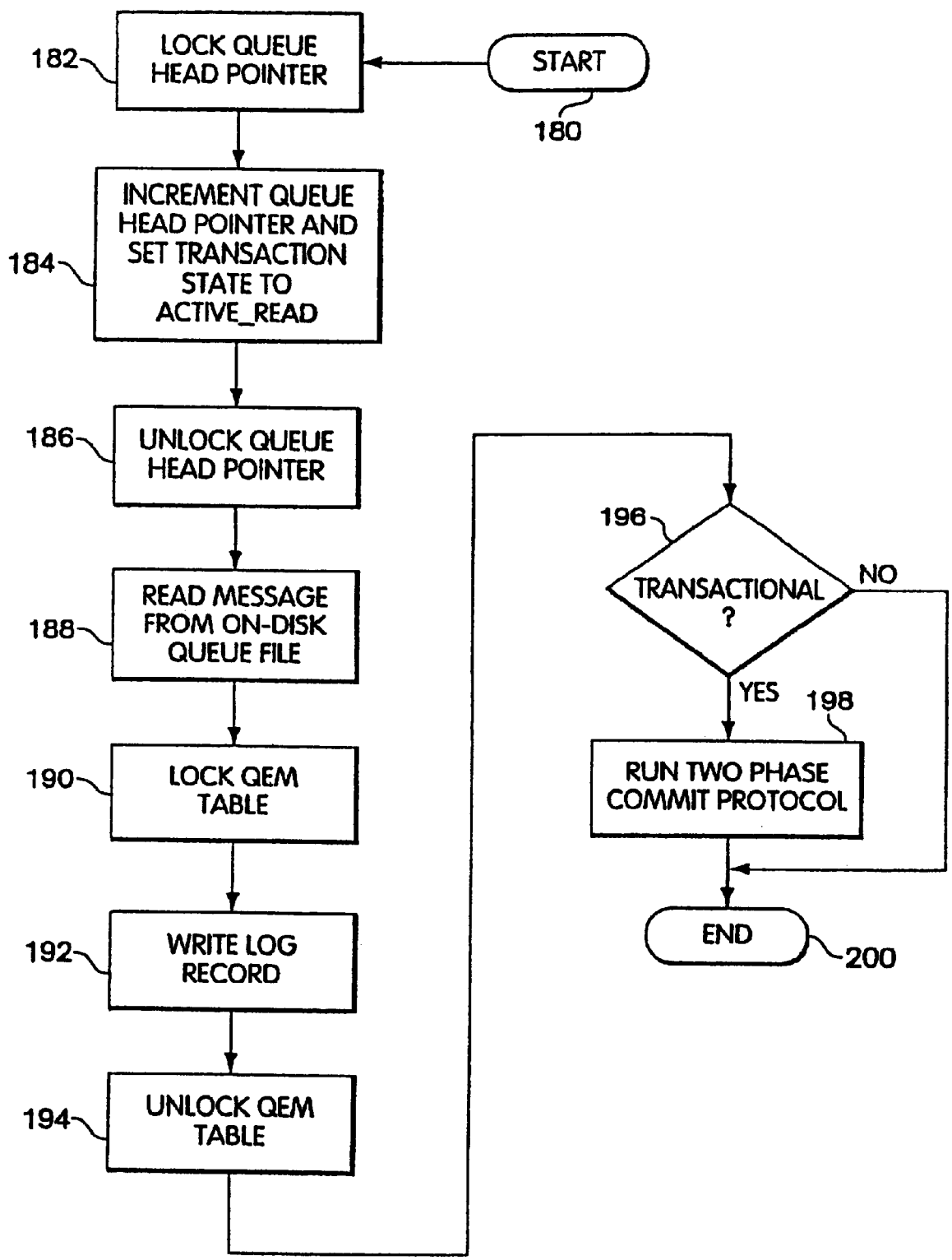
FIG. 11 is a flow chart illustrating the procedure for fetching a message from the queue.

Referring now to FIG. 11, what is shown is a flow chart for the write or $Q_{put}$ operation. In this flow chart, upon having started as illustrated at 180, a block queue head pointer 182 effectively puts a lock on the head of the list so that no other user can access the head entry. Thereafter, the system increments the queue head pointer and sets the transaction state to "active read" at 184. This indicates the beginning of the handshaking process.

As illustrated at 186, the system then unlocks the queue head pointer and then, as illustrated at 188, reads the messages from the on-disk queue file. Thereafter, the QEM Table is locked as illustrated at 190, whereafter the log record is written as illustrated at 192 and the QEM Table is unlocked as illustrated at 194. The output of the unlock QEM Table step is referred to a decision block 196 which ascertains if the message transmission is transactional. If so, as illustrated at 198, the system runs a two-phase "commit" protocol to permit handshaking. This completes the $Q_{put}$ or write operation at 200.

Figure 12:
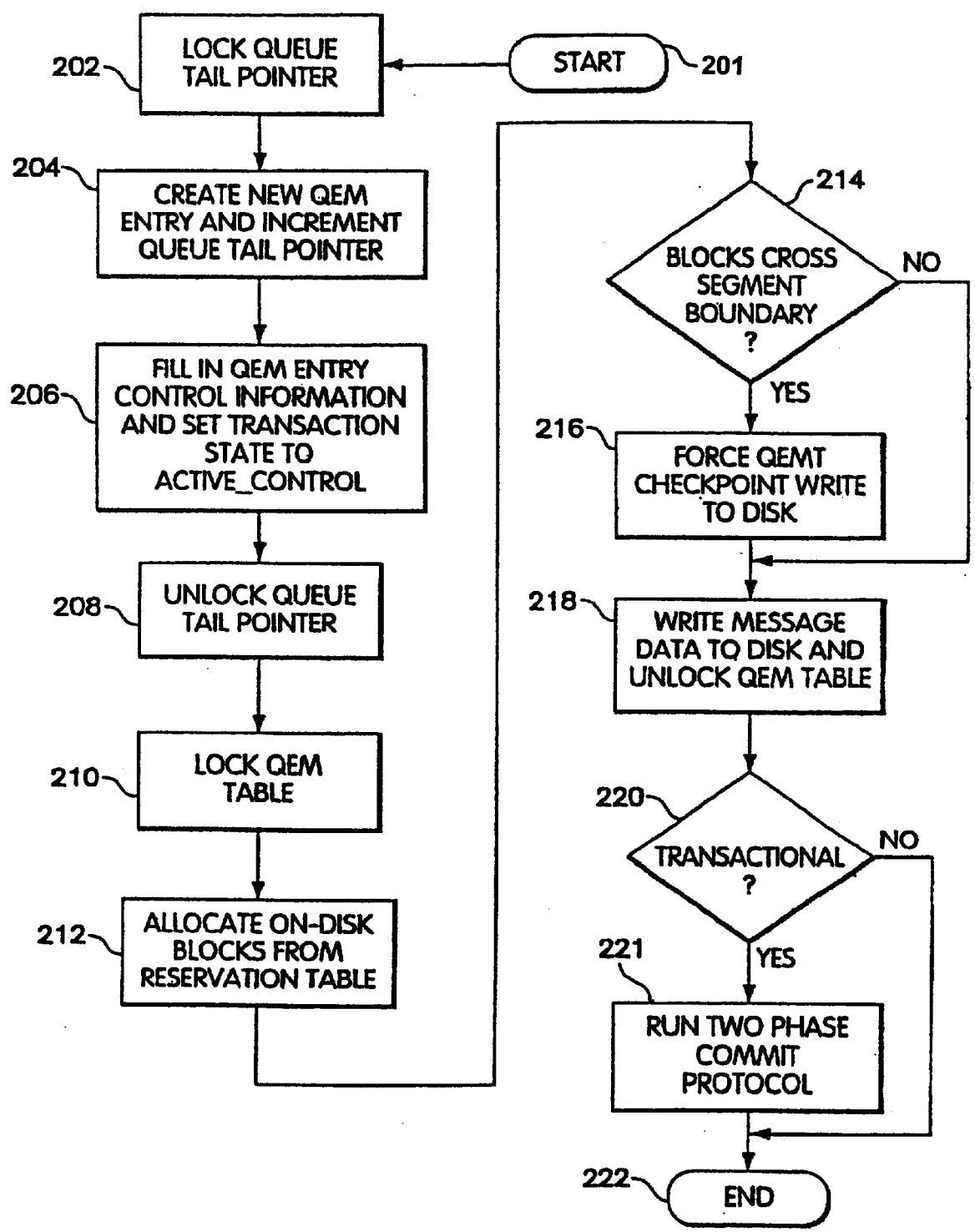
FIG. 12 is a flow chart illustrating a procedure for writing a message in the queue; and, FIG. 13 is a flow chart illustrating the recovery process in which the most recent QEMT is identified by an initial scan, with subsequent reading of the log records following the identification of the most recent QEMT resulting in a completely restored state.

Referring now to FIG. 12, a $Q_{get}$ or read operation is described. As can be seen, upon starting as illustrated at 201, the queue tail pointer is locked as illustrated at 202 and a new QEM entry is created with the queue tail pointer being incremented as illustrated at 204. Thereafter, as illustrated at 206, the system fills in the QEM entry control information and sets the transaction state to "active control". Thereafter, as illustrated at 208, the queue tail pointer is unlocked and the QEM table is locked as illustrated at 210. Subsequently, as illustrated at 212, the system allocates on-disk blocks from the reservation table, with a block crossing a segment boundary being indicated at decision block 214. If the blocks cross segment boundaries, then as illustrated at 216, the system forces the QEMT check point write to disk. This refers to the fact of writing the in-memory copy to disk. It will be appreciated that block 206 updates the in-memory copy of the state of the QEM Table and thus the QEM entry.

After having forced the QEMT check point write to disk as illustrated at 218, the system writes the message data to disk and unlocks the QEM Table. Decision block 220 establishes whether or not the messages is a transactional one and if so, runs a two phase commit protocol as illustrated at 221 to facilitate the handshaking. The end of the write sequence is illustrated at 222. It will be appreciated that block 220 refers to the receiver end running the handshaking protocol.

Figure 13:
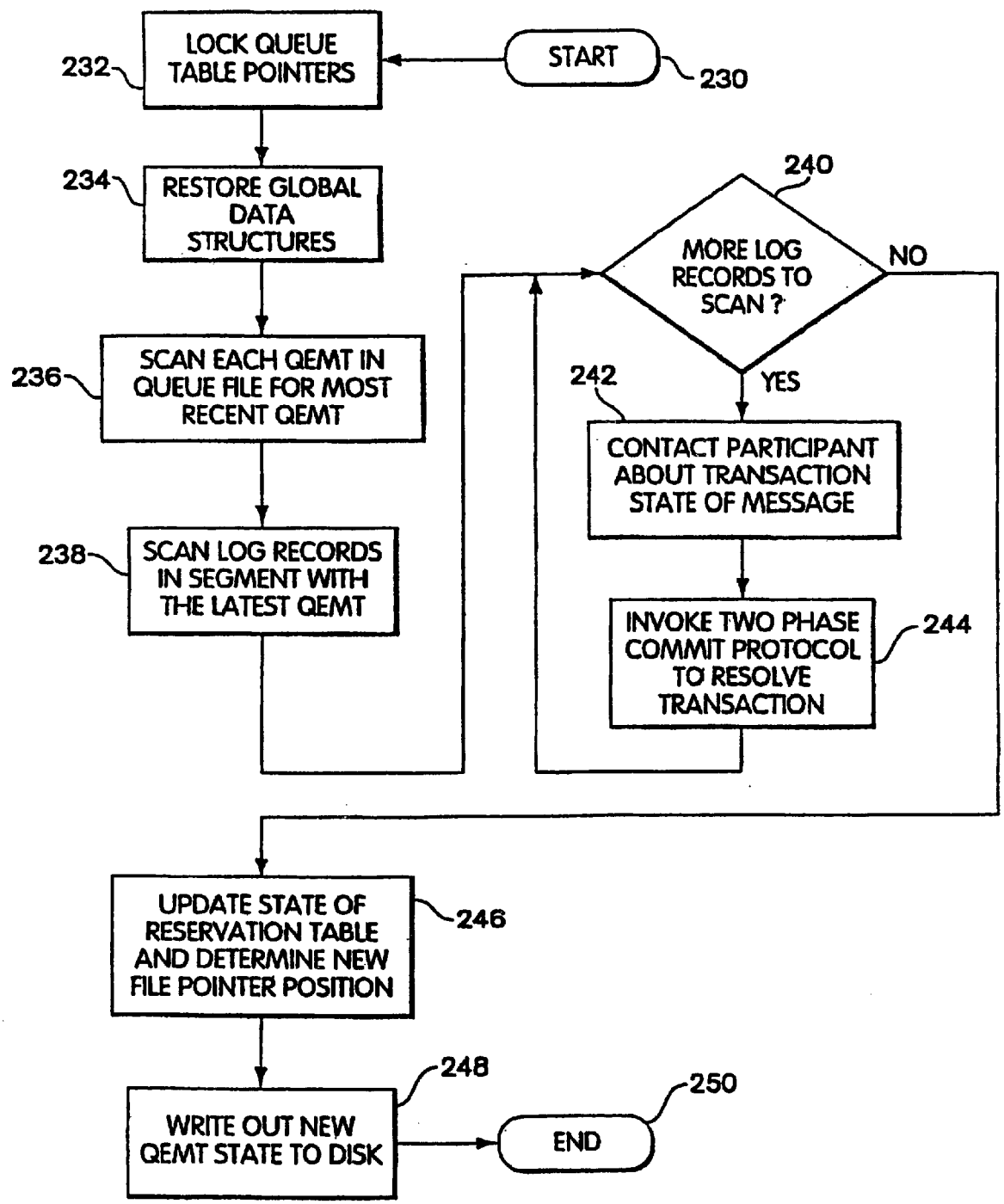

Referring now to FIG. 13, a recovery sequence is illustrated in which, upon starting as illustrated at 230, the queue table pointers are locked as illustrated at 232 and the system thereafter restores global data structure as illustrated at 234. This initializes the state of the system as a whole. Thereafter, as illustrated at 236 the system scans each QEMT in the queue file for the most recent QEMT. This establishes the most recent check point before communications interruption. Thereafter, as illustrated at 238, the system scans the log records in this segment for the log record with the latest QEMT. This means that the log records of the segment are applied to the messages referred to by the entries in the QEMT.

As illustrated at decision block 240, the system ascertains if there are more log records to scan. It will be appreciated that the QEMT specifies the most recent log record subsequent to the pointer associated with the QEMT in question. However, there may indeed be subsequent log records thereafter which need to be scanned. If this is the case, then the system contacts the participant about the transaction state of the message as illustrated at 242. In one instance, the receiver is queried as to whether it has received a message or not. Thereafter, the system invokes a two-phase "commit" protocol to resolve the transaction as illustrated at 244. This refers to the fact that the handshaking process is a two pass process. Thus, whatever state that one receives back from the receiver is used to restart the handshaking process at the point at which the system had failed.

As can be seen at 246, the system updates the state of the reservation table and determines a new file pointer position. Thus, the entire section is scanned to update the state of reservation table 140, with the determination of the new file pointer position being established by the current segment number 130 and the next available block in the current segment 136.

As illustrated at 248, the system then writes out the new QEMT state to the disk at which point the recovery is complete as illustrated at 250.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A message queuing system, comprising:
   means for transmitting a transactional message having an associated message queue including the state of the queue, message queue data and log records; and,
   means at a recipient site for storing said transactional message on a single disk in a single file utilizing a combined on-disk file structure for said message queue data and said log records.

2. The system of claim 1, and further including a read/write head for accessing said single disk and means for driving said head in a single forward direction during a write operation.

3. The system of claim 1, further comprising:
   a most recent queue entry management table placed on said disk at a preselected location, said table having a control information block, at least one message block and at least one log record.

4. The system of claim 3, wherein said preselected location corresponds to a fixed offset from the beginning of said file, thus to permit rapid identification of a most recent state of the message queue data.

5. The system of claim 4, further comprising:
   means at said recipient site for recovering said message queue upon interruption of transmitting said transactional message responsive to the most recent queue entry management table prior to said control information, whereby a last valid information received and stored is located from said control information contained in said most recent queue entry management table.

6. The system of claim 5, wherein said file is divided into sectors, and wherein said offset places said most recent queue entry management table at the beginning of a sector such that said table constitutes a checkpoint for the location of a sector having valid information, whereby the last valid information prior to said interruption may be rapidly located through the identification of the sector containing said most recent table.

7. The system of claim 2, wherein a most recent queue entry management table is stored in contiguous blocks.

8. A single electronic message queue file, comprising:
   a first control block;
   a second control block;
   a first plurality of contiguous data blocks disposed between the first and the second control blocks;
   a second plurality of contiguous data blocks disposed between the first and the second control blocks; and
   a plurality of contiguous log record blocks having information associated with a change made to one of the first and the second plurality of contiguous data blocks, and disposed between the first and the second plurality of contiguous data blocks.

9. A file according to claim 8, wherein the first plurality of contiguous data blocks stores a first message, and the second plurality of contiguous data blocks stores a second message different than the first message.

* * * * *